United States Patent
Bernier et al.

(10) Patent No.: US 10,459,121 B1
(45) Date of Patent: *Oct. 29, 2019

(54) INCREASED THERMAL STABILIZATION OF OPTICAL ABSORBERS

(71) Applicants: The Research Foundation for The State University of New York, Binghamton, NY (US); Crysta-Lyn Chemical Company, Inc., Binghamton, NY (US)

(72) Inventors: William E. Bernier, Endwell, NY (US); Megan Fegley, Vestal, NY (US); Bradley Galusha, Endicott, NY (US); Francis D. Goroleski, Binghamton, NY (US); Wayne E. Jones, Vestal, NY (US); Kenneth H. Skorenko, Binghamton, NY (US)

(73) Assignees: The Research Foundation for the State University of New York, Binghamton, NY (US); Crysta-Lyn Chemical Company, Inc., Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,833

(22) Filed: Jul. 31, 2017

Related U.S. Application Data

(62) Division of application No. 14/313,296, filed on Jun. 24, 2014.

(60) Provisional application No. 61/838,526, filed on Jun. 24, 2013.

(51) Int. Cl.
*G02B 1/04* (2006.01)
*G02B 5/23* (2006.01)
*G02B 5/20* (2006.01)

(52) U.S. Cl.
CPC ............... *G02B 1/04* (2013.01); *G02B 5/208* (2013.01); *G02B 5/23* (2013.01)

(58) Field of Classification Search
CPC ............. G02B 1/04; G02B 5/23; G02B 5/208
USPC .......................................... 136/256; 252/586
See application file for complete search history.

(56) References Cited

U.S. PATENT DOCUMENTS

2012/0305074 A1* 12/2012 Tanabe ................. H01G 9/2059
136/256

OTHER PUBLICATIONS

Paul G. Hoertz, Rachael A. Carlisle, and Gerald J. Meyer, Dong Wang, Piotr Piotrowiak, and Elena Galoppini, Organic Rigid-Rod Linkers for Coupling Chromophores to Metal Oxide Nanoparticles, Nano Lett., vol. 3, No. 3, 325-330, 2003. © 2003 American Chemical Society.*

* cited by examiner

*Primary Examiner* — Bijan Ahvazi
(74) *Attorney, Agent, or Firm* — Tully Rinckey PLLC; Steven M. Hoffberg

(57) ABSTRACT

Compositions for increasing the thermal stability of optical absorbers are provided as well as methods of making and using the resulting compositions. The compositions or complexes of the present teachings generally include an optical absorber bound to a metal or a metal oxide through one or more linkers, which contain a metal binding moiety.

18 Claims, 9 Drawing Sheets

INCREASED THERMAL STABILIZATION OF OPTICAL ABSORBERS

CROSS REFERENCE TO RELATED APPLICATIONS

This application is a Divisional of U.S. patent application Ser. No. 14/313,296, filed Jun. 24, 2014, now pending, which claims priority to and the benefit of U.S. Provisional Patent Application No. 61/838,526, filed on Jun. 24, 2013, the entire contents of which are incorporated by reference herein.

FIELD OF THE INVENTION

The present teachings relate to the thermal stabilization of optical absorbers for optical and optoelectronic applications. More specifically, the present teachings relate to the thermal stabilization of optical absorbers such as dye by association with a metal or a metal oxide.

BACKGROUND OF THE INVENTION

With the advent of flexible displays in military and commercial applications, there are a variety of needs for dyes that act as filters for special wavelengths such as laser light passing through the flexible display materials and screens. Recently numerous glass and flexible display manufacturers have been exploring application of these dyes in new technologies.

Ultraviolet, visible and near infrared optical absorbers or dyes currently are being used as filter materials to block or absorb specific wavelength ranges. For example, optical absorbers are used in security applications, to block specific light-emitting diodes ("LEDs") in ATM machines, and in laser welding. Currently, these dyes work well in conditions where there is limited exposure to sunlight and moderate temperatures. Several dyes are used in LCD filter technology, but are limited to indoor use, as long as there are only moderate thermal changes and minimal to no sunlight exposure.

Although organic dyes can be utilized in absorption of specific wavelengths of light, the dyes need to maintain their optical integrity during processing conditions. To ensure high structural integrity over a variety of environmental conditions, polymers with thermal and impact resistance usually are essential. Typically these polymers result in high temperature processing conditions above 150° C., through a melt extrusion process. Melt extrusion ensures complete mixing of the dye and polymer through thermal and mechanical cycling. This process adds excess stress over a long period of time, usually beyond the heat capacity of most organic dyes.

Several chemical manufacturers such as Crysta-Lyn Chemical Company (Binghamton, N.Y.) currently make designer dyes that can be tuned to specific wavelengths, which in combination can be used to block specific ranges of light through a film. However, the dyes typically lose optical stability when heated above 100° C. Degradation during processing can cause obstruction of view or optical failure through an inability to block the specified light.

Current approaches for stabilizing dyes utilize porphyrin rings, which have a complex synthesis and lead to high cost. Another approach is to utilize metal ions such as antimony; however, these tend to be expensive and hazardous to human health and the environment.

Thus, there is a need to improve the thermal stability of optical absorbers for use in various optical and optoelectronic applications where exposure of the optical absorber to heat and/or sunlight is expected.

SUMMARY OF THE INVENTION

The present teachings provide complexes of optical absorbers such as dyes as well as methods of making and using such complexes that can address various deficiencies and shortcomings of the state-of-the-art, including those outlined above. More specifically, the complexes of the present teachings including an optical absorber and a metal or a metal oxide can increase the thermally stability of the optical absorber such that its optical absorbance properties can be exploited in a variety of applications where exposure to heat and/or sunlight is expected.

Without wishing to be bound to any particular theory, it is believed that by binding an optical absorber to a metal oxide such as zinc oxide ("ZnO"), the thermal stability of the dye can be increased because the dye/metal oxide complex has a higher mass and a metal binding moiety of the dye such as a carboxylate group can be protected from degradation by bonding to the metal oxide.

The dye/metal oxide complex can be produced using an electrochemical process which utilizes an electrode of a metal oxide-forming metal and a counter electrode of a higher cathodic potential allowing the metal to oxidize, for example, oxide Zn to $Zn^{2+}$. The reaction is pushed to a higher yield by application of enough current, for example, with zinc, to keep the voltage above 30 V. The current may vary depending on the size of the electrode. After the ionized metal forms, it reacts with $O_2$ in the reaction vessel. Bubbling $O_2$ gas into the reaction vessel can help ensure sufficient $O_2$ supply to form a metal oxide.

The particle size of the metal oxide can be altered by the use of surfactants, which also can act as an electrolyte of the reaction. Changing the chain length of the hydrophobic portion as well as altering concentration allows for various sizes of metal oxide nanoparticles. The particle size of the metal oxide particles can be controlled and kept small so that the metal oxide remains optically transparent. The metal oxide can react with a metal binding moiety of the optical absorber through a metal-oxygen bridge to form the dye/metal oxide complex.

The electrochemical process of the present teachings readily can be applied to large scale production to provide increased thermal stability for optical absorbers. Increased thermal stability can be prolonged by preventing exposure to oxygen such as by incorporating and/or encapsulating the optical absorber/metal oxide complex in a polymer.

For example, optical absorber/metal oxide complexes can be incorporated into polymers such as plastics, which then can be used as light-absorbing glasses and solar-absorbing windows, for colorless bar-coding, infrared sensors, and other applications that are limited by their processing temperatures.

Thus, in one aspect, the present teachings provide complexes to stabilize thermally an optical absorber, where the complex can include an optical absorber; a linker, covalently bonded to the optical absorber and including a metal binding moiety; and a metal oxide complexed with, for example, bound to, the metal binding moiety. The complex can be placed in an oxygen-free or substantially oxygen-free environment, for example, by incorporation into a polymer.

The complexes can include one or more linkers, such as a first linker and a second linker, each independently bonded covalently to an optical absorber and each independently including a metal binding moiety. A linker can include an aliphatic hydrocarbon group and a metal binding moiety such as a Lewis base, a carboxylate group, and/or a sulfonate group. In certain embodiments, the metal binding moiety includes an oxygen atom. The metal of the complex can be a metal that can form an oxide, for example, cobalt, iron, nickel, titanium, zinc, and combinations thereof. In particular embodiments, the metal can be zinc and the metal oxide can be zinc oxide.

In another aspect, the present teachings include methods of making a complex of the present teachings, where the methods generally include applying to a solution an electric potential, where an electrode of a metal-oxide-forming metal is present in the solution; the solution includes oxygen and an optical absorber, where the optical absorber is covalently bonded to a linker and the linker comprises a metal binding moiety; and the electric potential is greater than the electric potential of the metal-oxide forming metal, thereby to form a complex of the present teachings.

The solution of oxygen and the optical absorber including a linker and a metal binding moiety can include a surfactant such as a tetraalkylammonium halide. The metal-oxide-forming metal can include cobalt, iron, nickel, titanium, zinc, and combinations thereof. In certain embodiments, the metal-oxide-forming metal can be zinc.

The methods of making a complex of the present teachings can include separating the complex from the solution. The methods can include washing the complex, for example, after the complex is separated from the solution. The methods can include introducing oxygen into the solution at least during a portion of the time when applying an electric potential to the solution.

In yet another aspect, the present teachings include methods of using the complexes of the present teachings. For example, the complexes of the optical absorbers of the present teachings can be associated with a polymer to form a polymer that includes optical absorbance properties similar to the optical absorber. Consequently, the resulting polymer product can be used in various applications where exposure to heat and/or sunlight is anticipated.

The foregoing as well as other features and advantages of the present teachings will be more fully understood from the following figures, description, examples, and claims.

BRIEF DESCRIPTION OF THE DRAWINGS

It should be understood that the drawings described below are for illustration purposes only. The drawings are not intended to limit the scope of the present teachings in any way.

FIG. 4A is for atomic mass units ("AMU") of 1-30 with 0.2 sec per scan and FIG. 4B is for AMU of 30-60.

FIG. 5A is for AMU of 1-30 with 0.2 sec per scan and FIG. 5B is for AMU of 30-60.

FIG. 6A is for AMU of 1-30 and FIG. 6B is for AMU of 30-60.

FIG. 7A is Dye 847 and FIG. 7B is ZnO/Dye 847 nanoparticles, both exposed to UV light for 3 hours.

FIG. 8A is Dye 847 and FIG. 8B is ZnO/Dye 847, both under ambient conditions over 27 days.

DETAILED DESCRIPTION OF THE PREFERRED EMBODIMENTS

Figure 1:
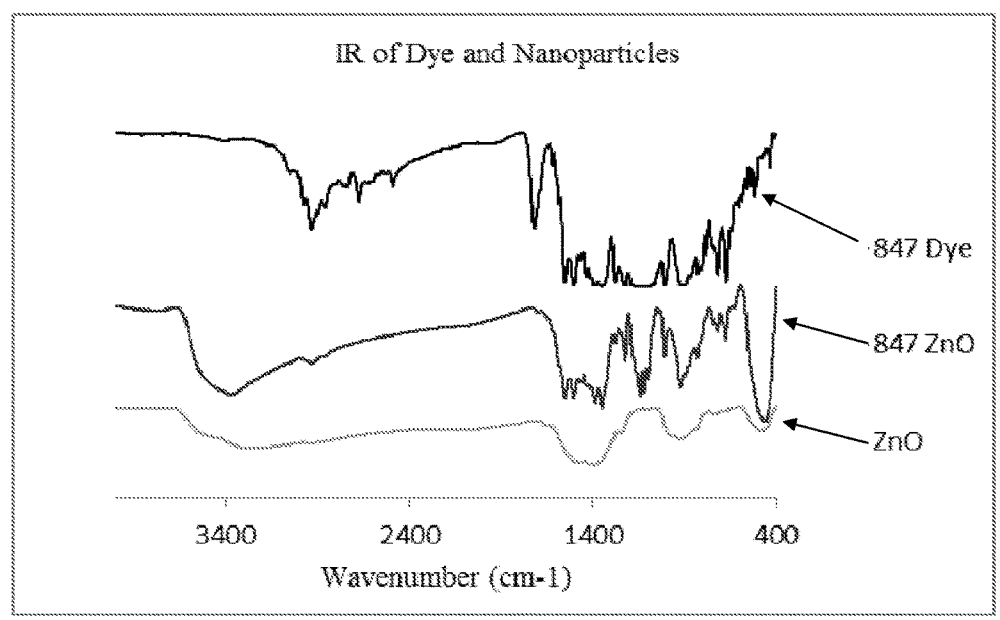
FIG. 1 is infrared ("IR") spectra of Dye 847, ZnO, and a Dye 847/ZnO complex.

It now has been discovered that by forming a complex of an optical absorber with a metal or a metal oxide, the thermal stability of the optical absorber can be increased such that the optical absorbance properties of the optical absorber can be exploited in a variety of applications where heat and/or sunlight exposure may be experienced. For example, in applications where certain wavelengths of light need to be filtered or absorbed, an appropriate optical absorber that absorbs those wavelengths of light can be selected to form a complex with a metal or a metal oxide according to the present teachings. If needed, a plurality of different complexes including different optical absorbers can be made separately and combined into a polymer or other material for use in a particular application, such as where more than one wavelength or range of wavelengths needs to be filtered.

For example, one application is to identify dyes that absorb in the wavelength ranges of 320-350, 435-455, 500-550, 600-630, 694, 1066, and 1152 nm, which are the wavelengths and wavelength ranges at which the most common lasers emit light. By designing dyes to absorb within these ranges and placing them in the lenses of eyewear, the laser emission can be disrupted, for example, before the laser light interferes with a warfighter's vision. Further, rather than designing one dye to absorb over this entire range, several dyes can be utilized, each with a narrow range to ensure a transparent optical device.

Final products made using the methods and materials of the present teachings can maintain optical transparency outside of the laser absorption range. These products can have value in multiple markets including flexible displays, dye sensitized solar cells, light emitting diodes, laser welding, and commercial eyewear.

Without wishing to be bound to any particular theory, it is believed that the compositions and methods of the present teachings cause the carboxylate ion to be protected through two possible mechanisms: the release of energy during heating and/or the provision of a higher atomic mass molecule, which can lead to a greater heat capacity. That is, the present teachings can increase the thermal stability of optical absorbers such as dyes during processing by binding them to a stable structure that absorbs thermal energy without disrupting their optical absorbance. Moreover, metal oxide nanoparticles such as ZnO nanoparticles can have interesting properties when dispersed in a film as they can be optically transparent, can have high thermal stability, and can maintain a high surface area for increased binding of the optical absorber to the metal oxide nanoparticles. (It should be understood that the expression "dye/metal oxide complex" or simply a "complex" interchangeably can be referred to herein, including equivalent expressions thereof, as a "dye nanomaterial," a "dye/metal oxide nanomaterial," a "dye nanoparticle," or a "dye/metal oxide nanoparticle."

Dyes incorporated into polymers can have glass transitions ranging from about 120° C. to about 300° C. While the lower limit can maintain the optoelectronic properties of the dyes, higher $T_g$ values often can degrade the dye, disrupting absorption. Previously, dyes have been thermally stabilized by incorporating the dyes into porphyrin rings or increasing the total molar mass of the dyes with heavy metals. Although such approaches have been effective, these syntheses require organic solvents and materials, which, when converted to an industrial scale, can become expensive and environmentally hazardous. To utilize polymers that maintain optical and physical integrity during thermal cycling and impact, dyes should remain electronically stable up to 200° C.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein. For example, where reference is made to a particular structure or composition such as a dye/ZnO complex of the present teachings, that structure or composition can be made and used in various embodiments of methods and applications of the present teachings, unless otherwise understood from the context.

It should be understood that the expression "at least one of" includes individually each of the recited objects after the expression and the various combinations of two or more of the recited objects unless otherwise understood from the context and use.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

At various places in the present specification, substituents are disclosed in groups or in ranges. It is specifically intended that the description include each and every individual subcombination of the members of such groups and ranges, and can include any combination of the various endpoints of such groups or ranges. For example, the term "$C_{1-6}$ alkyl" is specifically intended to individually disclose $C_1$, $C_2$, $C_3$, $C_4$, $C_5$, $C_6$, $C_1$-$C_6$, $C_1$-$C_5$, $C_1$-$C_4$, $C_1$-$C_3$, $C_1$-$C_2$, $C_2$-$C_6$, $C_2$-$C_5$, $C_2$-$C_4$, $C_2$-$C_3$, $C_3$-$C_6$, $C_3$-$C_5$, $C_3$-$C_4$, $C_4$-$C_6$, $C_4$-$C_5$, and $C_5$-$C_6$ alkyl. By way of other examples, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20. Additional examples include that the phrase "optionally substituted with 1-5 substituents" is specifically intended to individually disclose a chemical group that can include 0, 1, 2, 3, 4, 5, 0-5, 0-4, 0-3, 0-2, 0-1, 1-5, 1-4, 1-3, 1-2, 2-5, 2-4, 2-3, 3-5, 3-4, and 4-5 substituents.

The use of any and all examples, or exemplary language herein, for example, "such as" or "including," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of apparatus, devices, components, and/or features of the present teachings that may be illustrated in certain of the accompanying figures.

As used herein, the expression "optical absorber" refers to a compound that can absorb light, i.e., electromagnetic radiation of any wavelength, whether visible or not. An optical absorber can be a dye such as an organic dye (and the terms "dye" and "optical absorber" can be used interchangeably herein). An optical absorber usually can absorb light within a certain wavelength range or ranges. For example, an optical absorber can absorb light in the ultraviolet ("UV") spectrum of light, the visible ("Vis") spectrum of light, the near infrared ("NIR") spectrum of light, or combinations thereof.

An optical absorber can include one or more linkers in its structure and/or can be functionalizable with one or more linkers including a metal binding moiety. That is, an optical absorber, which can include commercially-available optical absorbers, can be functionalized by the additional of one or more linkers to the optical absorber, for example, by covalent bonding of the linker(s) to the optical absorber. In such cases, the linker can include a metal binding moiety that permits formation of a complex of the present teachings. Cyanine-based dyes typically can be functionalized with a linker, if needed. Organic dyes that have optical absorbance due to a pi-conjugated backbone usually need to be functionalized to allow for solubility in aqueous solutions. These dyes tend to be the most susceptible to thermal degradation.

As used herein, the term "linker" refers to a chemical group or groups that include a metal binding moiety and that can complex an optical absorber to a metal or a metal oxide. A linker can form part of the structure of an optical absorber and/or can be covalently bonded to an optical absorber. A linker can be complexed with a metal or a metal oxide through a metal binding moiety. A linker can be a metal binding moiety. A linker can be a chemical group such as a long chain chemical group that can provide separation between the optical absorber and the metal or metal oxide of the complex such that the resonance within the optical absorber is not disrupted thereby not altering the optical absorbance properties of the optical absorber. A linker can be flexible and can permit formation of a cyclical structure where two linkers are attached to an optical absorber and each of the two linkers complex with a metal or metal oxide to form the complex.

Examples of linkers include straight chain or branched alkyl groups containing a metal binding moiety such as a $C_2$-$C_{10}$ alkyl group having a metal binding moiety at a terminus or positioned elsewhere on the alkyl group. A linker can be a $C_2$-$C_9$ alkyl group, a $C_2$-$C_8$ alkyl group, $C_2$-$C_7$ alkyl group, a $C_2$-$C_6$ alkyl group, a $C_2$-$C_5$ alkyl group, a $C_2$-$C_4$ alkyl group, a $C_3$ alkyl group, or a $C_2$ alkyl group.

As used herein, the expression "metal binding moiety" refers to a chemical group that can associate or complex with a metal or a metal oxide such as by binding to the metal or the metal oxide. A metal binding moiety can be present at the terminal end of a linker, where the opposite terminal end of the linker can be bound to an optical absorber. A metal binding moiety can be present at a non-terminal position of a linker. In such cases, the metal binding moiety should not be positioned to interfere with the resonance and optical absorbance properties of the optical absorber. A metal binding moiety can be a polar functional group, which can permit solubility in polar solvents.

Examples of a metal binding moiety include a carboxylate group, a sulfonate group, a carbonate group, a phosphate group, a phosphinate group, an amide group, an amine group, a nitrate group, a hydroxyl group, a urea group, a thiourea group, a thiol group, and a halide. A metal binding moiety can be a Lewis base. One or more metal binding moieties independently can be present on a linker or in a complex of the present teachings.

Accordingly, the present teachings provide complexes to stabilize thermally an optical absorber using a metal or a metal oxide. More specifically, a complex of the present teachings can include an optical absorber; a linker, covalently bonded to the optical absorber and comprising a metal binding moiety; and a metal or a metal oxide complexed with the metal binding moiety. The optical absorber can absorb in one or more of the ultraviolet spectrum, the visible spectrum, and the near infrared spectrum.

In various embodiments, the complex can include a first linker and a second linker. Each of the first linker and the second linker independently can be bonded covalently to the optical absorber and can include a metal binding moiety. In some embodiments, the linker, or each of the first and second linkers, when present, can include an aliphatic hydrocarbon group. In particular embodiments, the linker, or each of the first and second linkers, when present, can terminate with a metal binding moiety.

In certain embodiments, the metal binding moiety independently can be selected from the group consisting of a carboxylate group, a sulfonate group, a carbonate group, a phosphate group, a phosphinate group, an amide group, an amine group, a nitrate group, a hydroxyl group, a urea group, a thiourea group, a thiol group, and a halide. In some embodiments, the metal binding moiety can include an oxygen atom. In particular embodiments, the metal binding moiety can include a carboxylate group and/or a sulfonate group.

In various embodiments, the metal can include at least one of aluminum, cobalt, copper, iron, nickel, titanium, and zinc, and the metal oxide is oxides thereof. In particular embodiments, the metal can be zinc and the metal oxide can be zinc oxide.

A population of complexes of the present teachings can include at least one of the following compounds:

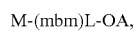

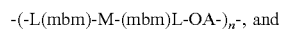

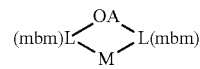

where "OA" represents an optical absorber, "L" independently represents a linker, "mbm" independently represents a metal binding moiety, "M" represents a metal or a metal oxide, and "n" can be an integer from 1 to 1000.

The present teachings also include methods of making a complex, i.e., a complex to stabilize thermally an optical absorber, or a population of such complexes, as described herein. More specifically, a method of the present teachings can include applying to a solution an electric potential, where an electrode of a metal-oxide-forming metal is present in the solution; the solution includes oxygen and an optical absorber, where the optical absorber can be bonded covalently to a linker and the linker can include a metal binding moiety; and the electric potential is greater than the electric potential of the metal-oxide-forming metal, thereby to form a complex of the present teachings. In some embodiments of the methods of the present teachings, the electrode can be a zinc electrode, and the metal binding moiety can include an oxygen atom.

In certain embodiments, the solution can include a surfactant such as a tetraalkylammonium halide. A surfactant can be replaced by any alkyl-chained amphiphile, which can yield different-sized dye/metal oxide particles such as dye/metal oxide nanoparticles.

In various embodiments, the methods of the present teachings can include separating the complex or a population of complexes from the solution. In some embodiments, the methods can include washing the complex, for example, with a solvent in which the dye is miscible such as methanol. In particular embodiments, the methods can include introducing oxygen into the solution at least during a portion of the time when applying an electric potential.

The methods of the present teachings generally include electrochemical deposition using a metal oxide-forming metal as one electrode, such as zinc which has a reduction potential of 0.76 V, and a counter electrode that can be any metal which will not be consumed at the applied electric potential. The sacrificial electrode can be a Lewis acid such as Ti, Ni, Fe, Cu, and Al. With respect specifically to zinc as the metal oxide-forming metal electrode, by applying a potential greater than 0.76 V, $Zn^{+2}$ ions can be formed in solution, which ions react readily with oxygen to form zinc oxide. With the optical absorber in solution, the optical absorber can bind to the metal oxide as the metal oxide is formed to provide increased density of the optical absorber.

The solution can include a surfactant such as a tetraalkylammonium halide, for example, tetrabutylammonium bromide or tetraoctylammonium chloride. The alkyl group can vary in carbon chain length. The halide can be fluoride, chloride or bromide, or can be replaced with other types of anions including perchlorate, hexafluorophosphate and the like. The surfactant is believed to surround the ZnO, thereby limiting the size of the particles. The solution also contains the organic dye, which can be bound to the zinc during formation of the ZnO. The process can be performed utilizing either a batch-by-batch process or a flow process, where the particles are removed after their formation. The particles then can be cleaned of surfactant, for example, by using a polar solvents.

To ensure a reaction is complete, a UV/Vis spectrum can be taken of the solvent wash after centrifuging, which should not show any significant dye peak. The final product can be analyzed by differential scanning calorimetry, thermal gravimetric analyses, and thermal gravimetric analysis coupled with mass spectrometry to determine composition and purity of the dye-nanomaterial.

The present teachings also include methods of using the complexes described herein. For example, an article of manufacture can include a complex or a population of complexes of present teachings. An article of manufacture can include a complex or a population of complexes that is associated with a polymer. For example, method of using a complex of the present teachings can include associating such a complex or a population of complexes with a polymer. The resulting polymer can have optical absorbance properties including those similar to or substantially similar to the optical absorbance properties of the optical absorber. The methods can include placing the complex or a population of complexes in an oxygen-free or substantially oxygen-free environment, for example, by incorporation into a polymer.

One process to incorporate dyes into a polymer matrix is known as melt extrusion. The melt extrusion process requires thermal and mechanical energy to relax the intermolecular interactions between polymer chains. Generally, this is accomplished through two overlapping screws that are heated to a desired temperature. The screws force the polymer material forward into a smaller area, stretching the polymer. This process can continue through multiple cycles to ensure mixing. The dye/metal oxide nanoparticles can be added to a melt extruder after the polymer has undergone several cycles, which ensure a thorough mixing of the nanoparticles with the polymer. The dye/metal oxide nanoparticles/polymer composite then can be ejected from the extruder to form pellets for storage and up scaling or into a mold for final device or product manufacturing. Melt-extruded films, pellets or other structure, with desired thermal, mechanical and optical properties, can be made using several polymer matrices including, poly(methyl methacrylate), polyvinyl alcohol, polycarbonate, and polyimide. If dye/metal oxide nanoparticles are to be used in high density polymers, the dyes should be able to withstand thermal conditions above 200° C.

Various types of polymers have different properties. Poly (methyl methacrylate) ("PMMA") typically is stored as granular sized particles, which can provide optimal mixing conditions for the dye/metal oxide nanoparticles. PMMA also has a low glass transition ("$T_g$"), about 100° C. Polycarbonate ("PC") is a standard material used in impact resistant visors, such as motorcycle and pilot helmets. The higher structural stability is due to stronger bonds between the polymer strands, leading to a higher $T_g$, about 147° C. This allows for thermal and structural stability testing. Polyimide is much more thermally resistant, with a $T_g$ of about 400° C. or greater, and could be utilized as laser blocking tape.

In various applications, the dye/ZnO nanoparticles can be mixed with polycarbonate to form pellets through a melt extruding process. The dye/ZnO nanoparticles can be dried before the melt extrusion process. The nanoparticles can be added to polycarbonate pellets in approximately 1 wt %. The melt extruder can grind the nanoparticles and polycarbonate between two heated screws (temperature of about 230° C.). The mixture can cycle through the screws through multiple passes to ensure proper mixing. The mixture then can be extruded out and cut into appropriate sized pellets.

Other potential applications include using inks containing the complexes in laser welding and creating absorbing thin films. In some applications, the dye/ZnO nanoparticle can be imbedded in an ink and laminated as described herein. For example, a PVC laminated film can be sandwiched between two polymers that are to be fused. IR light briefly can irradiate the polymer film, which causes the dye/ZnO nanoparticle to heat up and melt the polymer thereby fusing the two pieces together.

Pellets have a multitude of applications that can be used in the production of optical shields, windows, and plastic fabrics. In various applications, dye/ZnO nanoparticles can be melt extruded into pellets to form a master batch of a polymer including optical absorbing dye/metal oxide nanoparticles. These pellets then can be used to develop an optical shield for passive solar windows. For example, dye/ZnO nanoparticle pellets can be created as described herein, utilizing UV, Vis and Near IR dyes so as to cover distinct areas of the solar spectrum. The master batch of pellets, which can include about 1 wt % dye/ZnO nanoparticle and about 99 wt % polycarbonate can be added to a molding process for polycarbonate windows in about a 1:99 wt % ratio of pellets to polycarbonate, which provides about 0.1 wt % of dye/ZnO nanoparticles in the final batch. This composite material then can be melted at about 280° C. to create a viscous solution, which can be applied to a window mold and cooled to create a window that can absorb sunlight.

In certain applications, pellets can be used in the manufacture of sunglasses to create optical filtering eyewear that can block specific wavelengths. For example, the pellets containing a 0.1 wt % dye/ZnO nanoparticle mixture of polycarbonate can be heated to about 250° C. in a pressure-sealed vessel. The vessel can be affixed to a mold injector, which creates curved lenses commonly used in sunglasses (or other eyewear). The polymer mixture can be injected and the resulting lens cooled to create an optical filtering lens with the optical properties built into the polymer structure. Such lenses have applications in multiple sectors including optical filtering lenses for the military sector, UV and specific light filtering in the consumer sector as well as laser protection in the military and commercial sectors. Laser protection by the military sector can involve protection of warfighters' eye clarity, for use in aviation to protect against laser distractions during takeoff and landing, as well as in scope lenses to prevent flash blindness.

In various applications, the pellets can be added to a further melt extruding process to create thin fibers having about a 0.1 wt % concentration of dye/ZnO nanoparticles. The fibers can be utilized in a variety of applications. For example, the fibers can be melt extruded with an optical waveguide polymer, creating an absorptive layer within the fiber optic device. This layer can filter unwanted noise at distinct wavelengths, allowing a greater resolution for transferring data through fiber optics. In another application, these optical absorbing fibers can be used in military clothing to absorb IR light, which could allow advanced stealth materials that are resistant to IR detection for warfighters.

In some applications, the dye/ZnO nanoparticles can be applied to devices as a free standing film. For example, the dye/ZnO nanoparticles can be added to organic solvents such as chloroform and PMMA. The solvent solution can be spray-coated onto various materials, then dried to form a polymer layer on the material. For optical polymers, the layer can be added to a substrate such as a lens or a window to provide optical absorbing characteristics to the substrate with the potential for the film to be removed at a desired time. In military applications, a free standing film can be added to tanks and other vehicles to absorb UV, Vis and IR light, thereby to disrupt laser targeting systems.

The following examples are provided to illustrate further and to facilitate the understanding of the present teachings and are not in any way intended to limit the invention. That is, although the examples focus on complexes of Dye 847 and zinc oxide, it should be understood that the present teachings are equally applicable to other optical absorbers and metal oxide-forming metals as well as linkers and metal binding moieties.

Example 1. Preparation of Complex of Dye 847 and Zinc Oxide

Dye 847 has the following formula:

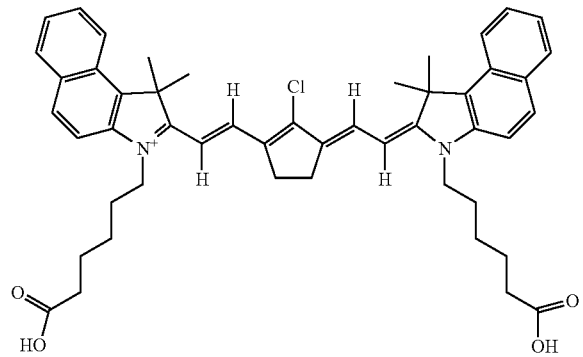 [SMILES: CC1(C)C(/C=C/C2=C(Cl)C(=C/C=C3/N(CCCCCC(=O)O)c4ccc5ccccc5c4C3(C)C)/CC2)=[N+](CCCCCC(=O)O)c2ccc3ccccc3c21]

A 0.001 M solution of Dye 847 is dissolved in a mixture of 0.1 M tetrabutylammonium bromide ("TBAB") in 2-propanol. The mixture was mixed using sonication to ensure the dye was completely dissolved, which turned the mixture a dark blue color.

An electrode of zinc metal (99.999% purity) was used as the anode and was affixed to a power source with a stainless steel cathode as the counter electrode. The zinc and steel electrodes were placed in the dye/tetrabutylammonium bromide mixture. The mixture then was purged with oxygen for 20 minutes (and was continually purged with oxygen during the electrochemical deposition).

The current was set to ensure that a voltage was maintained between about 20 V and about 30 V. The electrochemical process continued for about two hours. Confirmation of completion of the reaction was shown by removal of color from the mixture. The mixture now contained Dye 847, tetrabutylammonium bromide, impurities, and Dye 847/ZnO nanoparticles. To remove tetrabutylammonium bromide, any impurities and unbound dye, the Dye 847/ZnO nanoparticles were washed with multiple rinses of methanol, followed by centrifugation and decanting of the solvent.

To ensure the reaction was complete, a UV/Vis spectrum was taken of the solvent wash after centrifugation, which wash did not show any significant Dye 847 peak.

The Dye 847/ZnO nanoparticles were stored in methanol in a sealed container to prevent evaporation.

Example 2. Infrared Spectrometry of Dye 847, ZnO, and Dye 847/ZnO Complex

As shown in FIG. 1, infrared ("IR") spectroscopy demonstrates that the dye binds through its carboxylic acid or carboxylate groups directly to the Zn (or ZnO), through a Zn—O bridge. The C—O$^-$ peak at about 1620 cm$^{-1}$ is no longer present in the complex indicating binding through the carboxylate ion. The C—O$^-$ anchoring group is imperative to prevent displacement of the dye in later steps. The presence of dye is confirmed by the presence of the various C—H stretches between 400 and 1600 cm$^{-1}$.

Example 3. Differential Scanning Calorimetry of Dye 847, ZnO, and Dye 847/ZnO Complex Differential Scanning calorimetry ("DSC") utilizes a temperature change while measuring the difference in heat release or absorbed by a sample compared to a reference, in this case, air. The samples are heated to 400° C. at a heating rate of 10° C./min. The DSC data for Dye 847, ZnO, and a Dye 847/ZnO complex can be seen in FIG. 2.

Figure 2:
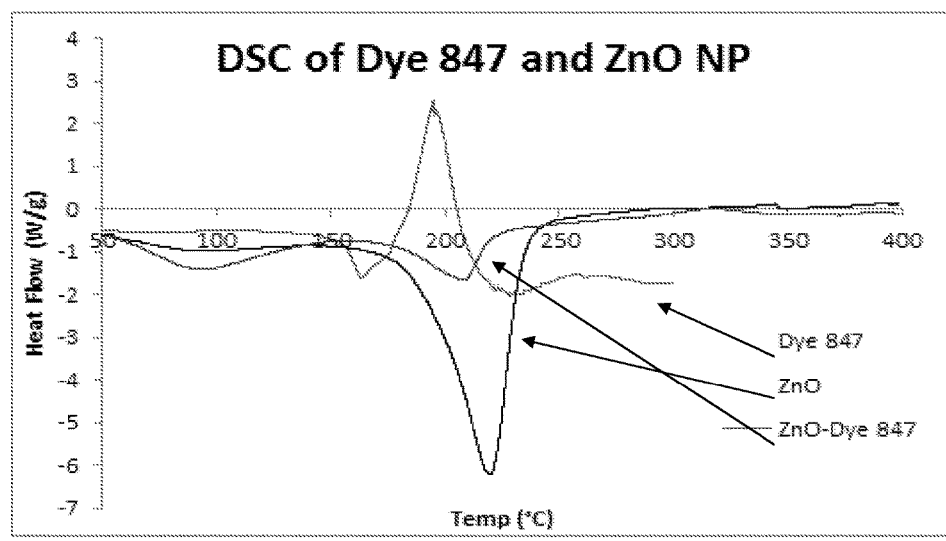
FIG. 2 is differential scanning calorimetry ("DSC") spectra of Dye 847, ZnO/Dye 847, and ZnO control. The sample was heated to 400° C. at a rate of 10° C./min.

As shown in FIG. 2, Dye 847 starts to show degradation at about 160° C., then gradually degrades over the next 90° C. until it levels off at about 250° C. In contrast, the Dye 847/ZnO nanoparticles show stability over the entire 400° C. range. The fluctuations seen at about 100 and about 220° C. correlate to the ZnO control, indicating these heat changes are most likely due to the surfactant TBAB, which was also absorbed to the surface. The peak at about 210° C. is much lower in the case of Dye 847/ZnO nanoparticles compared to the control. This result is likely due to less TBAB being absorbed to the surface compared to the ZnO control because there also is dye absorbed on the Dye 847/ZnO nanoparticles.

The degradation continues until about 200° C., indicating that there is an amount of heat capacity which protects the dye. However, it has been shown in other UV experiments that heat capacity alone may not offer enough protection for high temperature melt extrusion. When a dye is bound to ZnO, the peak associated with dye degradation is absent. The peaks seen for the dye bound to ZnO are also seen in the ZnO reference and can be attributed to tetrabutylammonium bromide. TGA-MS and DSC confirm that the carboxylate group is being degraded first, at about 150° C. When the dye is bound to ZnO, bridging can occur through the carboxylate group, which can provide further thermal protection to the dye, for example, enhancing its thermal stability to about 300° C.

Example 4. Thermal Gravimetric Analysis of Dye 847, ZnO, and Dye 847/ZnO Complex DSC can show at what temperatures reactions take place. Thermal Gravimetric Analysis ("TGA") and Thermal Gravimetric Analysis coupled with Mass Spectrometry ("TGA-MS") can determine the extent of degradation as well as the by-products produced by these reactions by recording the change in weight of a sample as it is heated. While measuring the weight changes, the heated sample off-gasses to a mass spectrometer, which can detect various atomic mass units ("AMU") that are being produced.

Figure 3:
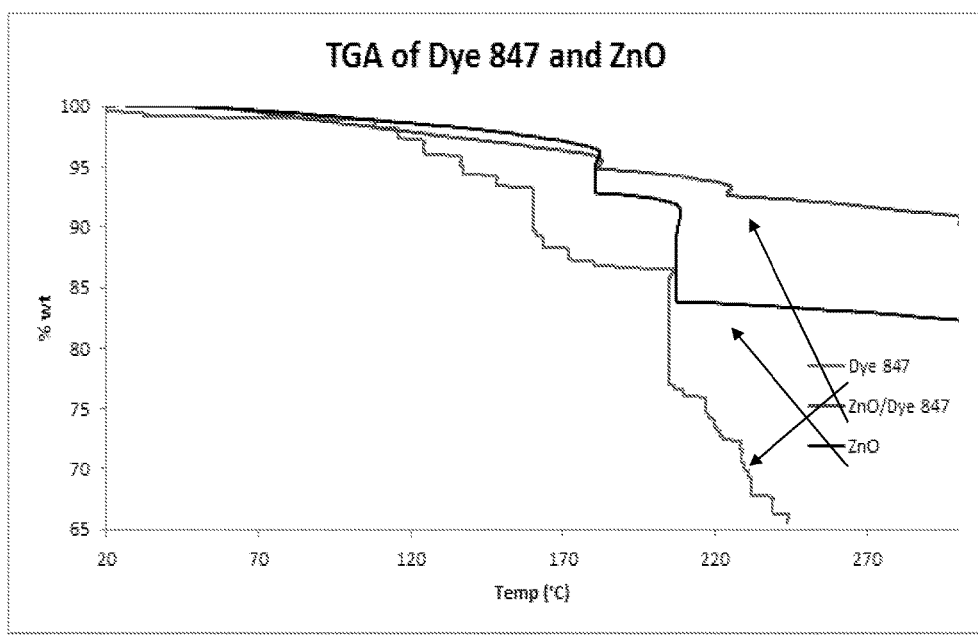
FIG. 3 is thermal gravimetric analysis ("TGA") of Dye 847, ZnO/Dye 847, and ZnO control. The sample was heated to 300° C. at a heating rate of 10° C./min under an oxygen atmosphere with isothermal initiation at weight percent changes of greater than one percent of the total mass.

FIG. 3 shows the TGA of Dye 847, ZnO/Dye 847 and ZnO control, heated to 300° C. When the mass change is greater than 1 wt %, the temperature is held until there is a change less than 0.05 wt %, which leads to the well-defined slopes seen in the TGA. The masses have been converted to % mass for comparison.

The TGA correlates with previous DSC data, where Dye 847 shows a large decrease in weight at about 160° C. and then a large decrease in weight at about 210° C. The products of these weight decreases are discussed with the TGA-MS data below. When comparing the Dye 847/ZnO nanoparticles to the ZnO control, the general decrease in wt % is shown by both the control and the nanoparticles. At about 180° C., both the control and nanoparticles shown a decrease in wt %, which will be discussed with the TGA-MS data below. The control, however, shows its next major wt % decrease at about 210° C. while the Dye 847/ZnO nanoparticles do not show a major decrease until about 230° C. This observation also is discussed with the TGA-MS data below. In sum, the TGA data indicates a higher thermal stability when Dye 847 is bound to ZnO compared to Dye 847 alone.

Figures 4A, 4B:
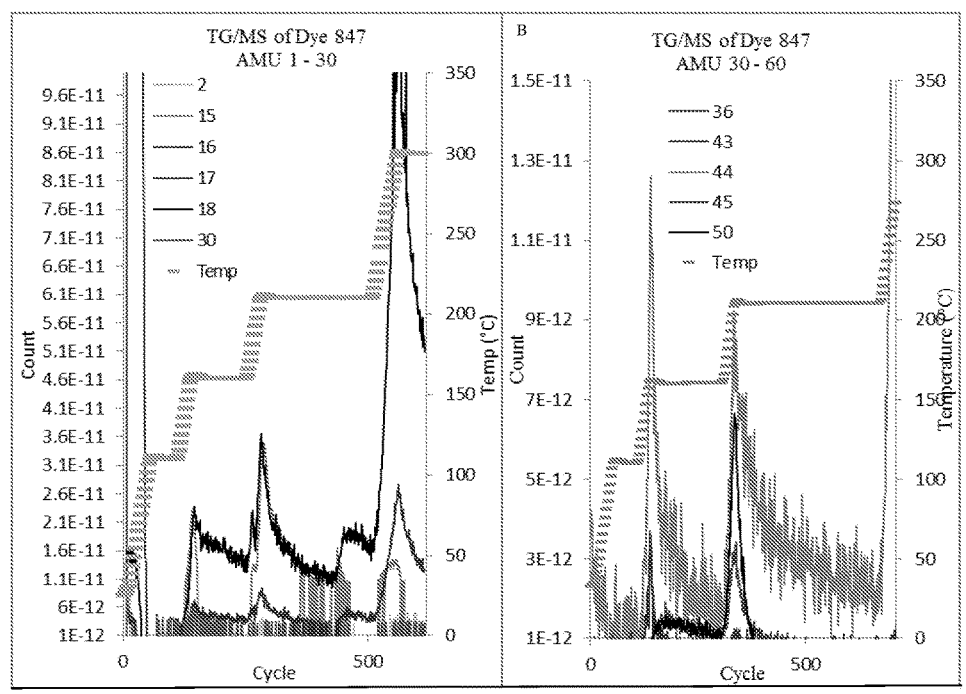
FIGS. 4A and 4B are thermal gravimetric analysis coupled with mass spectrometry ("TGA-MS") of Dye 847. TGA was measured under oxygen conditions with a ramp speed of 10° C./min with selected isothermals. Mass spectra were scanned at an increment of 30 AMU at 0.2 sec/scan with a sensitivity of 10-12 ion count where

Example 5. Thermal Gravimetric Analysis Coupled with Mass Spectrometry of Dye 847 and Dye 847/ZnO Complex As shown in FIGS. 4A and 4B, the TGA-MS of Dye 847 shows an ion count of each atomic mass, where each mass is measured by a cycle whose time fluctuates depending on whether the temperature is ramping or held at an isothermal. The temperature values are shown as marked dashes and correlate to the right y-axis. In this graph, oxygen (AMU 16) and carbon dioxide (AMU 44) can be seen in large ion counts being removed starting at about 160° C. These off-gases at about 160° C. and about 300° C. are indicative of a combustion reaction, most likely from carboxylic acid (AMU 45), which also off-gasses. The off-gassing before about 100° C. is most likely due to excess solvent and water being evaporated.

As seen in FIGS. 4A and 4B, several ions are counted before the sample reaches 100° C., for example, at AMU 2, 16 and 18. These ions are due to $H^+$, $O^+$, and $H_2O^+$, respectively, and come off before heating due to the presence of oxygen gas causing the solvents absorbed on the sample to evaporate. The peaks shown at about 110° C. correspond with the TGA results for Dye 847 and are due to AMU 15, 16, 17, 18 and 30, which correspond to $CH_3^+$, $O^+$, $HO^+$, $H_2O^+$, and $N_2H_2^+$, respectively. At about 110° C., the dye likely starts releasing more solvated water as well as breaking down some carbon, most likely due to residual solvents such as methanol. The $CO_2$ released is due to the carboxylate group of the dye breaking down. The next peak occurs at about 160° C. and released AMU 15, 16, 17, 18, 30, 44 and 45, which correspond to $CH_3^+$, $O^+$, $HO^+$, $H_2O^+$, $N_2H_2^+$, $CO_2^+$, and $HCO_2^+$, respectively. Again there can be loss of solvent but the production of $CO_2$, which in an oxygen environment is most likely due to a combustion reaction of the carboxylate group, is also present. The next peak occurs at about 210° C. and release AMU 15, 16, 17, 18, 30, 36, 44, 45 and 50, which correspond to $CH_3^+$, $O^+$, $HO^+$, $H_2O^+$, $N_2H_2^+$, $HCl^+$, $CO_2^+$, $HCO_2^+$, and $ClO^+$, respectively. The production of $CO_2$ due to the carboxylate group degradation still is present. However, a large presence of $Cl^+$ and $ClO^+$ also is being produced indicating the chlorine bond of the dye was broken. Finally, there is one final peak as the sample ramps to about 300° C., where remaining carboxylate is being degraded.

Figures 5A, 5B:
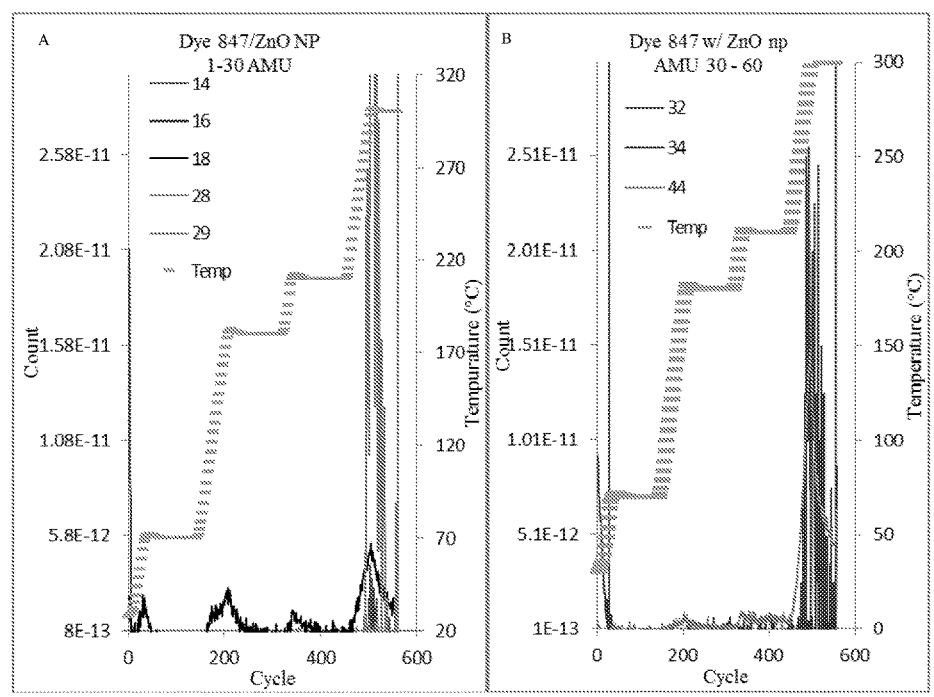
FIGS. 5A and 5B are TGA-MS of Dye 847 bound to ZnO nanoparticles. TGA was measured under oxygen conditions with a ramp speed of 10° C./min with selected isothermals. Mass spectra were scanned at an increment of 30 AMU at 0.2 sec/scan with a sensitivity of 10-12 ion count, where

As shown in FIGS. 5A and 5B, the TGA-MS data of Dye 847 when it is bound to ZnO nanoparticles shows enhanced thermal stability of the carboxylic acid group, up to about 300° C. While slight off-gassing of water (AMU 18) is seen throughout the analysis, no significant release of oxygen or carbon dioxide is seen until about 300° C., indicating the carboxylic acid group has been protected through electrochemical synthesis of the dye/metal oxide nanoparticles. Stability for over an hour above about 125° C., the temperature at which Dye 847 normally degrades, can indicate the mechanism for thermal stability can be through the release of energy to the ZnO nanoparticles rather than heat capacity. This effect can allow for multiple cycling of the dye/ZnO nanoparticles through processing, as well as in the field.

Figures 6A, 6B:
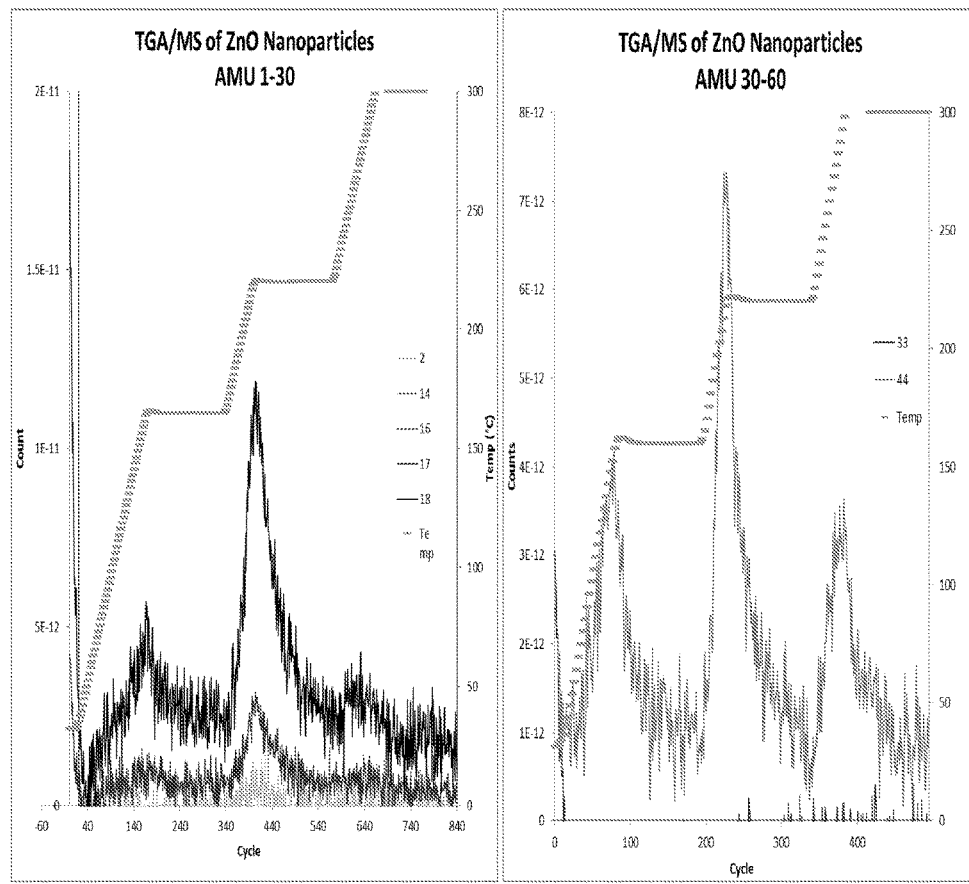
FIGS. 6A and 6B are TGA-MS spectra of ZnO nanoparticles, where

As shown in FIGS. 6A and 6B, the TGA-MS data for ZnO nanoparticles, unlike Dye 847 bound to ZnO nanoparticles, shows a breakdown of oxygen and carbon dioxide throughout the analysis. This effect likely is due to tetrabutylammonium bromide that was bound to the surface of the ZnO nanoparticles. A further indication of this effect can be seen in the DSC data.

Example 6. Ultraviolet-Visible Spectrometry of Dye 847/ZnO Complex in Epoxy Upon Exposure to Ultraviolet and Ambient Radiation Although thermal stability is important, the absorption properties of the dye also should remain unchanged to be useful in industrial applications. Light sensitivity of a dye or dye complex also can be an issue. Dye 847/ZnO nanoparticles completely degrade upon exposure to ambient light (sunlight) over a two day period, while Dye 847 remains stable (not shown).

Without wishing to be bound to any particular theory, it is believe that the degradation is due to the catalytic effect of ZnO bound to the dye. ZnO requires water, which can be added by moisture in the air. The addition of water provides an extra electron, which is attracted to the cationic dye and destabilizes the dye's resonance, leading to degradation of the dye. However, in end applications, the dye/metal oxide nanoparticles can be encapsulated in a polymer matrix, thereby protecting the dye/ZnO nanoparticles from bulk oxygen and/or moisture exposure.

Figures 7A, 7B:
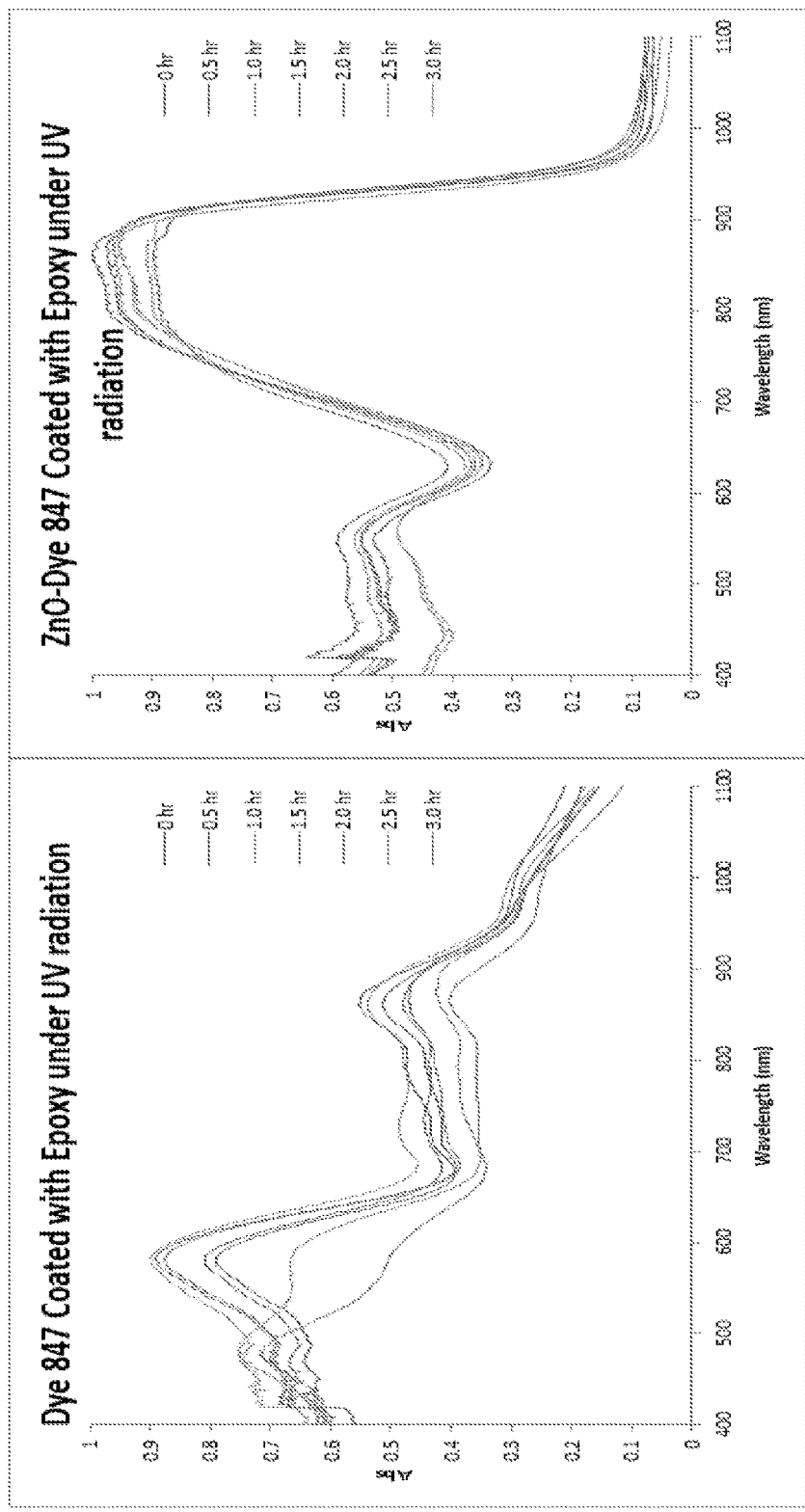
FIGS. 7A and 7B are UV/Vis spectra where

To ensure that no oxygen can contaminate the sample, films were prepared inside a glove box and encapsulated using a two-part epoxy system. The sample was then exposed to either UV light or ambient light. FIGS. 7A and 7B show the absorbance under UV light over 3 hours.

FIGS. 7A and 7B show that over the course of 3 hours, both samples show relatively stable absorption between about 850 nm and about 900 nm. Dye 847 has an overall lower intensity due to interactions between the carboxylate group of the dye and the sulfates from the epoxy. Dye 847/ZnO nanoparticles show a broader peak that extends from about 750 nm to about 910 nm due to interactions between the carboxylate —Zn bridging.

Figures 8A, 8B:
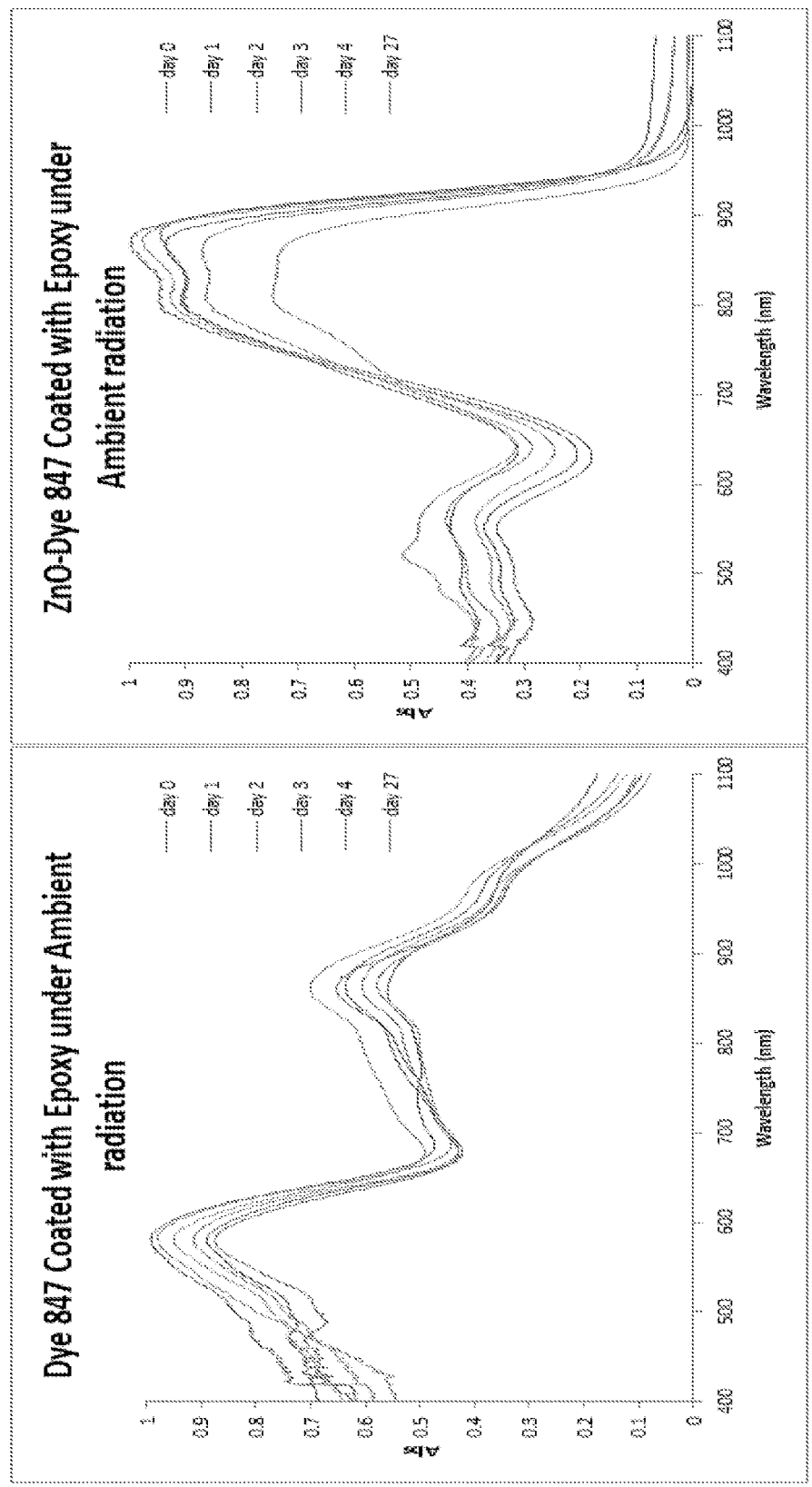
FIGS. 8A and 8B are UV/Vis spectra where
Figure 9:
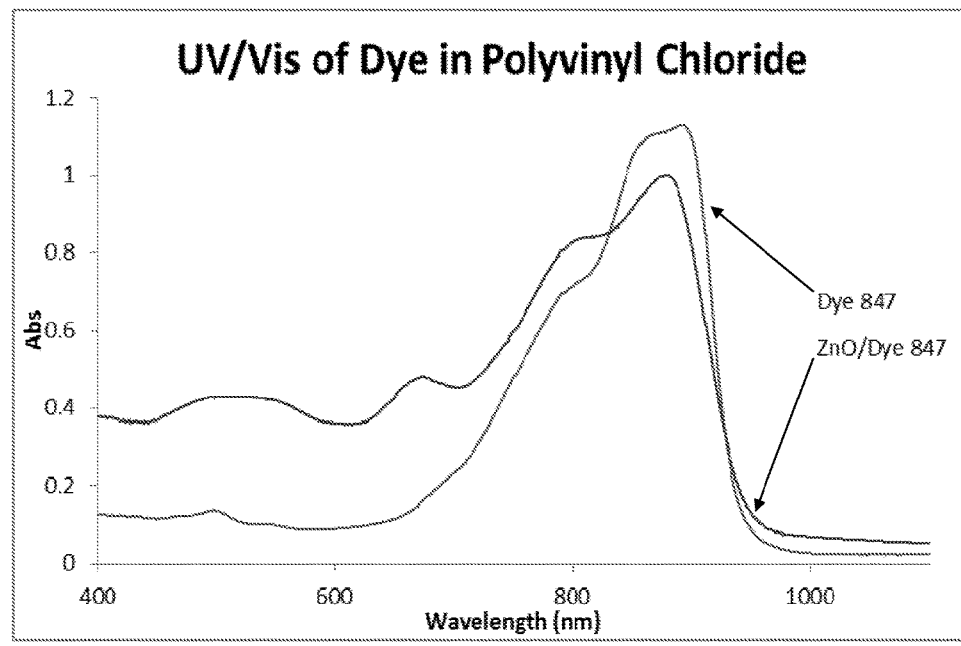
FIG. 9 is UV/Vis spectra of Dye 847 and ZnO/Dye 847 that has been encapsulated in polyvinyl chloride using a laminator at 140° C.

FIGS. 8A and 8B show the absorbance of Dye 847, unbound and bound to ZnO, with a protective layer of epoxy to prevent oxygen and moisture exposure, over 27 days in direct sunlight (ambient conditions).

As seen over 4 days under ambient conditions, both Dye 847 and ZnO/Dye 847 nanoparticles are stable. However, when looking at longer term stability, there is some decrease in the absorbance of Dye 847/ZnO nanoparticles comparable to the dye alone.

Under the same conditions, Dye 847 shows stability over six months (not shown), indicating there was no degradation from oxygen or light. The Dye 847/ZnO nanoparticles show light stability over about one month, but after six months the absorbance near 800 nm has decreased (not shown). Although the Dye 847/ZnO nanoparticle sample showed some degradation, the peak about 800 nm has a higher intensity compared to the corresponding peak of the unbound dye. Because ZnO requires a carboxylate ion for binding, this result indicates that the binding process increases the purity of the sample.

A decrease in the Dye 847/ZnO nanoparticle stability can be due to oxygen degradation because the dye is bound to ZnO nanoparticles, increasing the surface area. Increased surface area can allow more oxygen to access the dye, causing a faster degradation under light.

Example 7. Ultraviolet-Visible Spectrometry of Dye 847 and Dye 847/ZnO Complex in Polyvinyl Chloride The UV/Vis of Dye 847 and Dye 847/ZnO nanoparticles that have been encapsulated in a polyvinyl chloride (PVC) polymer can be seen in FIG. 8. FIG. 8 shows that at about 140° C., both Dye 847 and Dye 847/ZnO nanoparticles maintain a stable absorbance at about 800 nm-900 nm. This is expected as the dye typically does not show substantial degradation until about 160° C.

Example 8. Dye 847/ZnO Complex Laminated Using PVC

Dye 847/ZnO nanoparticles were mixed with a modified PVC polymer at a 1:9 wt ratio to form a viscous ink. The ink was sonicated under heat and stirred to ensure complete mixing. The ink was screen printed on a sheet of PVC, about 200 μm thick, and the resulting film was tested for uniformity and absorbance, showing an even coating and appropriate absorbance of 0.85. The film was sandwiched between a second sheet of PVC and was laminated. The lamination process requires high pressure as well as a temperature ramp from about 20° C. to about 140° C. The temperature was held at 140° C. for 1 min and allowed to cool down to about 60° C. to complete the lamination process. The whole process takes about 20 minutes. The final composite was tested for absorbance, showing no degradation of the dye/ZnO nanoparticle during the lamination process.

Example 9. Dye 847/ZnO Complex in Free Standing Film

Dye 847/ZnO nanoparticles were dissolved in a solution of chloroform and PMMA (7.8:1 by weight). The solution then was sonicated and cast into a mold where it was heated to 80° C. and allowed to dry. The mold was removed leaving a free standing PMMA film with the Dye 847/ZnO nanoparticles embedded therein.

Example 10. Preparation of Complex of Dye Containing Sulfonate Groups with Zinc Oxide Prior to electrochemical deposition, a dye containing sulfonate groups ("sulfonate dye") is studied using a potentiostat to determine that the sulfonate dye starts to degrade at about 10 V. To account for this degradation, the electric potential during the electrochemical deposition will be held between about 5 V and about 8 V, which allows for deposition of ZnO without degradation of the sulfonate dye.

A 0.001 M sulfonate dye solution is dissolved in a 0.1 M tetraoctylammonium chloride solution and is purged with oxygen before the electrochemical deposition process. The mixture is a violet color. An electric potential of between about 5 V and about 8 V is applied for 4 hours until the violet color is gone and the solvent is tested using UV/Vis spectrometry to determine whether the sulfonate dye is completely removed from the mixture.

Acetone is used as a cleaning solvent due to the solubility of the dye. The sulfonate dye/ZnO nanoparticles are rinsed, centrifuged and decanted 6 times and stored in acetone. The final product, i.e., a sulfonate dye/ZnO complex, is analyzed by differential scanning calorimetry and thermal gravimetric analysis coupled with mass spectrometry to determine composition and purity of the sulfonate dye/ZnO complex.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A thermally stable optical absorber, comprising:
   a metal oxide particle;
   a first metal binding moiety, bound to a metal atom of the metal oxide particle;
   an optical absorber dye having a resonant pi-conjugated optical absorbance structure; and
   a first linker, covalently bonded to the first metal binding moiety, comprising an alkyl group having a chain length of $C_3$-$C_{10}$ non-conjugated carbons and to the optical absorber dye, configured to separate the first metal binding moiety and the optical absorber dye by at least three non-conjugated carbon atoms, to prevent the metal oxide particle from quenching the resonant pi-conjugated optical absorbance structure of the optical absorber dye.

2. The thermally stable optical absorber according to claim 1, wherein:
   the metal oxide particle comprises a nanoparticle,
   the thermally stable optical absorber dye is provided within a polymer matrix which isolates the thermally stable optical absorber dye from environmental oxygen, and
   the thermally stable optical absorber dye is stable against degradation for at least one hour at a temperature above 125° C.

3. The thermally stable optical absorber according to claim 1, further comprising a second linker, covalently bonded to the second metal binding moiety, comprising an alkyl group having a chain length of $C_3$-$C_{10}$ non-conjugated carbons and to the optical absorber dye, configured to separate the second metal binding moiety and the optical absorber dye by at least three non-conjugated carbon atoms, to prevent the metal oxide particle from quenching the resonant pi-conjugated optical absorbance structure of the optical absorber dye.

4. The thermally stable optical absorber according to claim 1, wherein the first linker provides separation between the dye and the metal oxide, such that a resonance within the dye is not disrupted by the metal oxide.

5. The thermally stable optical absorber according to claim 1, wherein the optical absorber absorbs in the visible or ultraviolet spectrum.

6. The thermally stable optical absorber according to claim 1, wherein the first metal binding moiety is selected from the group consisting of a carboxylate group, a sulfonate group, a carbonate group, a phosphate group, a phosphinate group, an amide group, an amine group, a nitrate group, a hydroxyl group, a urea group, a thiourea group, a thiol group, and a halide.

7. The thermally stable optical absorber according to claim 1, wherein the metal oxide comprises at least one of cobalt oxide, iron oxide, nickel oxide, titanium oxide, and zinc oxide.

8. The thermally stable optical absorber according to claim 1, wherein the metal oxide comprises zinc oxide.

9. The thermally stable optical absorber according to claim 1, comprising:

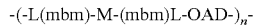

-(-L(mbm)-M-(mbm)L-OAD-)$_n$- wherein OAD is the optical absorber dye, L independently is the first linker, mbm independently is the first metal binding moiety, M is the metal oxide, and n is an integer from 1 to 1000.

10. The thermally stable optical absorber according to claim 1, provided within a polymer matrix.

11. A method of making a complex to stabilize thermally an optical absorber, the method comprising:
providing a solution comprising oxygen and an optical absorber, the optical absorber comprising a dye having a covalently bonded linker comprising an alkyl group having a chain length of $C_3$-$C_{10}$ non-conjugated carbons, with a metal binding moiety;
applying an electric potential to the solution through an electrode comprising a metal-oxide-forming metal, wherein the electric potential is greater than an oxidation potential of the metal-oxide-forming metal, to thereby form a metal oxide; and
forming a complex comprising the optical absorber with the metal binding moiety complexed with the metal binding moiety.

12. The method of claim 11, wherein the solution further comprises a surfactant.

13. The method of claim 11, comprising introducing oxygen into the solution at least during a portion of the time when applying an electric potential.

14. The method of claim 11, comprising separating the complex from the solution.

15. The method of claim 11, wherein the metal oxide-forming metal is zinc, and the metal binding moiety comprises an oxygen atom.

16. The method of claim 11, comprising, after formation, placing the complex in an oxygen-free or substantially oxygen-free environment comprising a polymer matrix.

17. The method of claim 11, further comprising associating the complex with a polymer to form a polymer-complex association having optical absorbance properties substantially similar to the optical absorbance properties of the optical absorber.

18. A thermally stable optical absorber, comprising:
a metal oxide particle; and
an optical absorber comprising a dye having a chemically resonant structure having conjugated pi bonds, a linker comprising an alkyl group having a chain length of $C_3$-$C_{10}$ non-conjugated carbons, and a metal binding moiety chemically bonded to a metal atom of the metal oxide particle,
wherein:
the linker is configured to separate the metal oxide particle and the dye by at least three non-conjugated carbon atoms, to prevent the metal oxide particle from quenching an excitation of the chemically resonant structure having conjugated pi bonds,
the thermally stable the optical absorber being chemically stable at 125° C., and
the dye is chemically unstable at 125° C.

* * * * *